US005242215A

United States Patent [19]
Krause

[11] Patent Number: 5,242,215
[45] Date of Patent: Sep. 7, 1993

[54] INTERFACE FOR DISSIMILARLY BRAKED VEHICLES

[75] Inventor: Jeffrey J. Krause, Olmsted Falls, Ohio

[73] Assignee: Allied-Signal Inc., Morristown, N.J.

[21] Appl. No.: 706,504

[22] Filed: May 28, 1991

[51] Int. Cl.⁵ .............................................. B60T 13/00
[52] U.S. Cl. ........................................... 303/7; 303/15
[58] Field of Search ...................... 303/3, 7, 15, 16, 17, 303/20; 439/35, 179

[56] References Cited

U.S. PATENT DOCUMENTS

| | | |
|---|---|---|
| 3,034,598 | 5/1962 | LaFaye . |
| 3,110,507 | 11/1963 | Riner . |
| 3,497,707 | 2/1970 | Stewart . |
| 3,768,870 | 10/1973 | Howard . |
| 4,046,399 | 9/1977 | Zeuner et al. . |
| 4,072,362 | 2/1978 | Van Anroay . |
| 4,076,327 | 2/1978 | Hubbard .................... 303/7 X |
| 4,105,257 | 8/1978 | Engle et al. . |
| 4,111,452 | 9/1978 | Carlsson . |
| 4,183,599 | 1/1980 | Wetzig . |
| 4,239,292 | 12/1980 | Nagase . |
| 4,436,347 | 3/1984 | Stumpe . |
| 4,568,129 | 2/1986 | Stampe ........................ 303/7 |
| 4,585,278 | 4/1986 | Grauel et al. . |
| 4,620,109 | 10/1986 | Kummer . |
| 4,624,472 | 11/1986 | Stuart et al. . |
| 4,679,863 | 7/1987 | Ikeda et al. . |
| 4,708,402 | 11/1987 | Kanda . |
| 4,781,393 | 11/1988 | Jeter . |
| 5,080,445 | 1/1992 | Brearley et al. ................ 303/7 |

FOREIGN PATENT DOCUMENTS

| | | |
|---|---|---|
| 0278228 | 8/1988 | European Pat. Off. . |
| 3726822 | 12/1988 | Fed. Rep. of Germany . |
| 2606354 | 5/1988 | France . |
| 58-93646 | 6/1983 | Japan . |
| 2131508 | 6/1984 | United Kingdom . |

Primary Examiner—Robert J. Oberleitner
Assistant Examiner—Lee W. Young
Attorney, Agent, or Firm—Ken C. Decker; William N. Antonis

[57] ABSTRACT

Two different types of converter boxes (38, 84) provide the required interface for transmitting service brake control signals from the tractor unit (12) of a tractor-trailer combination vehicle to the trailer unit (16) thereof in which the tractor unit (17) and trailer unit (16) are provided with dissimilar braking systems. One type of converter box (38) provides the interface between a tractor (12) equipped with an electropneumatic braking system in which service brake applications are controlled by electrical signals and a conventional trailer (16) in which service brakes are controlled by pneumatic signals. The other type of converter box (84) provides the required interface between a tractor (12) which has service brakes controlled by conventional pneumatic signals and a trailer unit (16) which is provided with and electropneumatic braking system in which service brake applications are controlled by electrical signals.

15 Claims, 3 Drawing Sheets

INTERFACE FOR DISSIMILARLY BRAKED VEHICLES

This invention relates to an interface between the tractor brake system and the trailer brake system of a tractor-trailer combination unit in which one of the units has a braking system actuated electropneumatically and the other unit has a braking system which is actuated solely by pneumatic signals.

Existing heavy duty tractor-trailer road vehicles are equipped with compressed air braking systems in which the brakes of both the tractor and the trailer are actuated by compressed air. The foundation brakes of the braking system are controlled by relay valves which connect the foundation brakes with corresponding compressed air reservoirs when the relay valves receive a pneumatic signal generated by the vehicle operator by operating the foot valve or the hand brake valve which are located in the vehicle operator's compartment. More recently, electropneumatic brakings systems have been proposed, in which the vehicle operator generates electrical signals instead of pneumatic signals for effecting brake actuation. In such systems the existing operator actuated foot brake valve and/or hand brake control valve are replaced by equivalent devices which generate electrical signals which are variable in magnitude by the vehicle operator. These electrical signals are transmitted to electrically actuated brake pressure modulators, which respond thereto to effect communication of varying pressure levels in proportion to the magnitude of the electrical signal to the compressed air actuated vehicle foundation brakes. Such an electropneumatic system offers many advantages over the prior art pneumatic systems, and such an electropneumatic braking system is disclosed in U.S. Pat. No. 4,749,238.

Of course, such electropneumatic braking systems will not immediately replace all pneumatic systems which are operated at the time the electropneumatic systems are introduced. Obviously, a period of years will be required in which some vehicles will be equipped with electropneumatic systems and other vehicles will be equipped with the older pneumatic systems. Furthermore, since a single tractor may be used to pull many trailers, and conversely, each trailer may be pulled by several tractors, it is probable that vehicle operators will be required to operate a combination vehicle in which a tractor equipped with an electropneumatic braking system is used to pull a trailer equipped with a pneumatic braking system. Similarly a trailer equipped with an electropneumatic braking system may be pulled by a tractor equipped with a pneumatic braking system. Accordingly, an interface is needed to convert electrical signals generated by the braking system of a tractor equipped with an electropneumatic braking system to pneumatic signals required by a trailer equipped with a pneumatic braking system, and a tractor equipped with a pneumatic braking system will need an interface to pull a trailer equipped with an electropneumatic braking system.

The present invention provides interfaces for conversion of braking signals transmitted from a tractor to a trailer having a dissimilar braking system. The interface is provided by a converter box which is designed to be portable and thus transferable from vehicle to vehicle to provide the required interface. Two different interfaces are necessary. An interface between an electropneumatically braked tractor and pneumatically braked trailer is necessary, and a different interface between a Pneumatically braked tractor and an electropneumatically braked trailer is also necessary. The interfaces may be provided in separate converter boxes, or a single converter box may include both interfaces, although only one interface would be used at a time.

These and other advantage of the present invention will become apparent from the following description, with reference to the accompanying drawings in which FIG. 1 is a diagrammatic illustration of a tractor-trailer combination vehicle in which both the tractor unit and the trailer unit are provided with the prior art pneumatically actuated braking systems;

Figure 1:
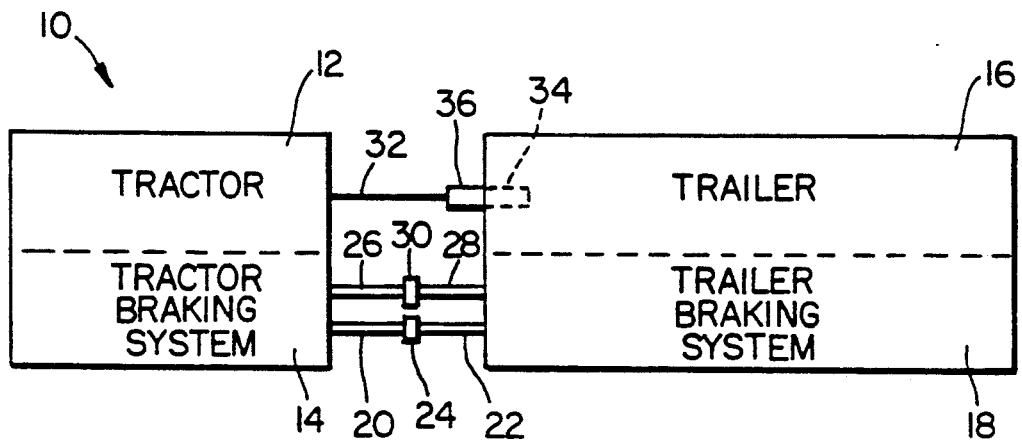
Figure 2:
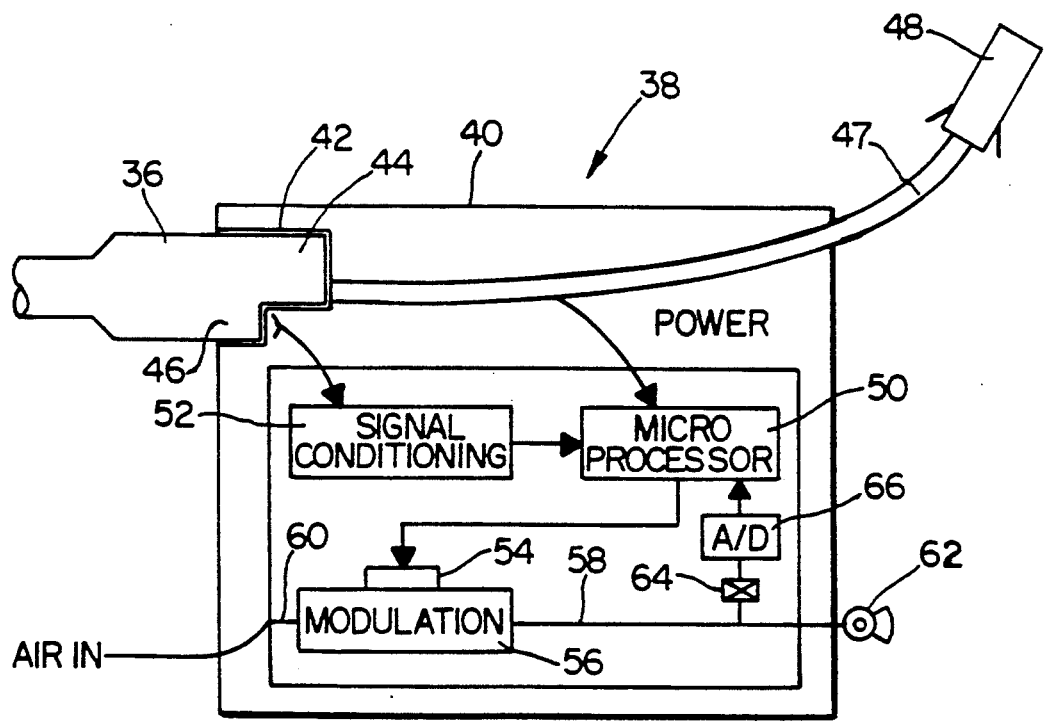
FIG. 2 is a diagrammatic illustration of a converter box used to provide an interface between an electropneumatically braked tractor and a pneumatically braked trailer.

Referring now to FIG. 1 of the drawings, a prior art tractor-trailer combination vehicle is generally indicated by the numeral 10. The vehicle 10 includes a tractor unit 12 having a tractor braking system illustrated schematically at 14 and a trailer unit 16 having trailer braking system illustrated schematically at 18. The tractor braking system 14 includes a conventional air compressor (not shown) which is powered by the vehicle engine. Tractor braking system 14 further includes a supply line 20 which is coupled to a corresponding supply line 22 by a conventional gladhand coupling illustrated schematically as at 24. The supply lines 20, 22 permit compressed air generated by the air compressor to be transferred to the trailer braking system 18, where it is used to charge system reservoirs (not shown) to provide a source of air pressure for actuating the vehicle foundation brakes, and also to provide hold-off pressure to the vehicle parking/emergency brakes.

Tractor braking system 14 further includes a service or control line 26, which is connected to a corresponding service or control line 28 connected to the trailer braking system 18 through another conventional gladhand coupler 30. The service or control lines 26, 28 transmit pneumatic signals in response to operator actuation of the foot or hand brake control valves in the tractor operator's compartment to effect an actuation of the trailer service brakes. The pneumatic pressure signals transmitted through the control or service line 26, 28 operate relay valves (not shown) comprising a part of the trailer braking system 18 to communicate the trailer foundation brakes with reservoirs charged with air pressure.

Electrical power is transmitted from the tractor unit 12 to the trailer unit 16 through a seven conductor jumper cable 32 carried by the tractor unit 12 which terminates in a connector 36 received in a conventional receptacle 34 on trailer 16. The jumper cable 32 transmits electrical power to the trailer unit 16 for operation of the trailer clearance lights, tail lights, stop lights, etc. In an electropneumatic braking system, the service lines 26, 28 are eliminated, and the jumper cable 32 is provided with additional conductors (in addition to the normal seven conductors for supplying power to the trailer) to provide brake actuating signals to control the foundation brakes comprising the trailer braking system 18. As disclosed in prior art U.S. Pat. No. 4,842,532, the cable connector 36 and receptacle 34 used in such an electropneumatic braking system have offset portions which carry, respectively, the conductors used to transmit power for operation of the trailer clearance, lights, tail lights, stop lights, etc. and the signals for operating the electropneumatic brakes.

A converter box generally indicated by the numeral 38 is used to provide an interface between a tractor braking system in which electropneumatic signals are used to actuate the vehicle foundation brakes and a trailer braking system in which conventional pneumatic signals are used to activate the trailer foundation brakes. In such an arrangement, the tractor unit 12 includes a jumper cable 32 having conductors carrying both electrical power to the trailer and also conductors carrying electropneumatic braking signals. The trailer is equipped with a conventional service or control brake line 28, and will be equipped with a receptacle which can only receive a conventional seven-pin electrical connector. The various components of the converter box 38 are enclosed within a housing 40 so the converter box 38 may be quickly and easily moved from vehicle to vehicle. The converter box 38 includes a receptacle 42 for receiving the connector 36 on the jumper cable 32 extending from the tractor unit 12. As discussed above, the connector 36 is of the type designed for electropneumatic braking as disclosed in U.S. Pat. No. 4,842,532. Connector 36 includes offset portions 44, 46, and the receptacle 42 is similarly offset to receive the connector 36. The conductors extending into the offset portion 44 are the seven conductors normally used to transmit power from the tractor unit 12 to the trailer unit 16. These seven conductors are passed through the converter box 38 and extend through a cable portion 47 which extends from converter box 38 and which terminates in a conventional seven-pin conductor 48 for connection into the conventional seven-pin receptacle 34 on the trailer 16. Power is tapped off from one of the seven conductors in an amount necessary to operate microprocessor 50, which effects conversion of the electropneumatic signals transmitted to the converter box 38 into the pneumatic signals necessary to operate the conventional pneumatic braking system on the trailer 16, as will hereinafter be described.

The conductors in the offset portion 46 of cable connector 36 transmit electropneumatic braking signals for control of electropneumatic brakes. These signals transmitted through the electropneumatic conductors are passed through conventional signal conditioning circuitry 52 and are then passed to microprocessor 50. Microprocessor 50 transmits a signal actuating a proportional solenoid indicated schematically as at 54, which is a part of a proportional modulator generally indicated by the numeral 56. Proportional modulator 56 is more fully disclosed in U.S. patent application Ser. No. 599,761, filed Oct. 18, 1990. The proportional modulator 56 generates a pneumatic signal at output port 58 thereof which directly proportional to the magnitude of the signal transmitted to solenoid 54 from microprocessor 50. The proportional modulator 56 includes an input port 60, which is connected to the air brake system of the tractor unit 12. The connection can be effected by providing an appropriate connector to an air reservoir carried by the tractor 12. Accordingly, full supply air is supplied to the proportional modulator 56, which generates a signal at output port 58 which varies in direct proportion to the electrical signal transmitted through the jumper cable 32. The output port 58 is connected through the housing 40 and terminates in a conventional gladhand connector 62, for connection with the corresponding gladhand connector 30 carried by service or control line 28 comprising a part of the trailer braking system 18. The pressure level at gladhand connector 62 is measured by a conventional transducer 64 and fed back to the microprocessor 50 through conventional analog-to-digital conversion 66.

Figure 4:
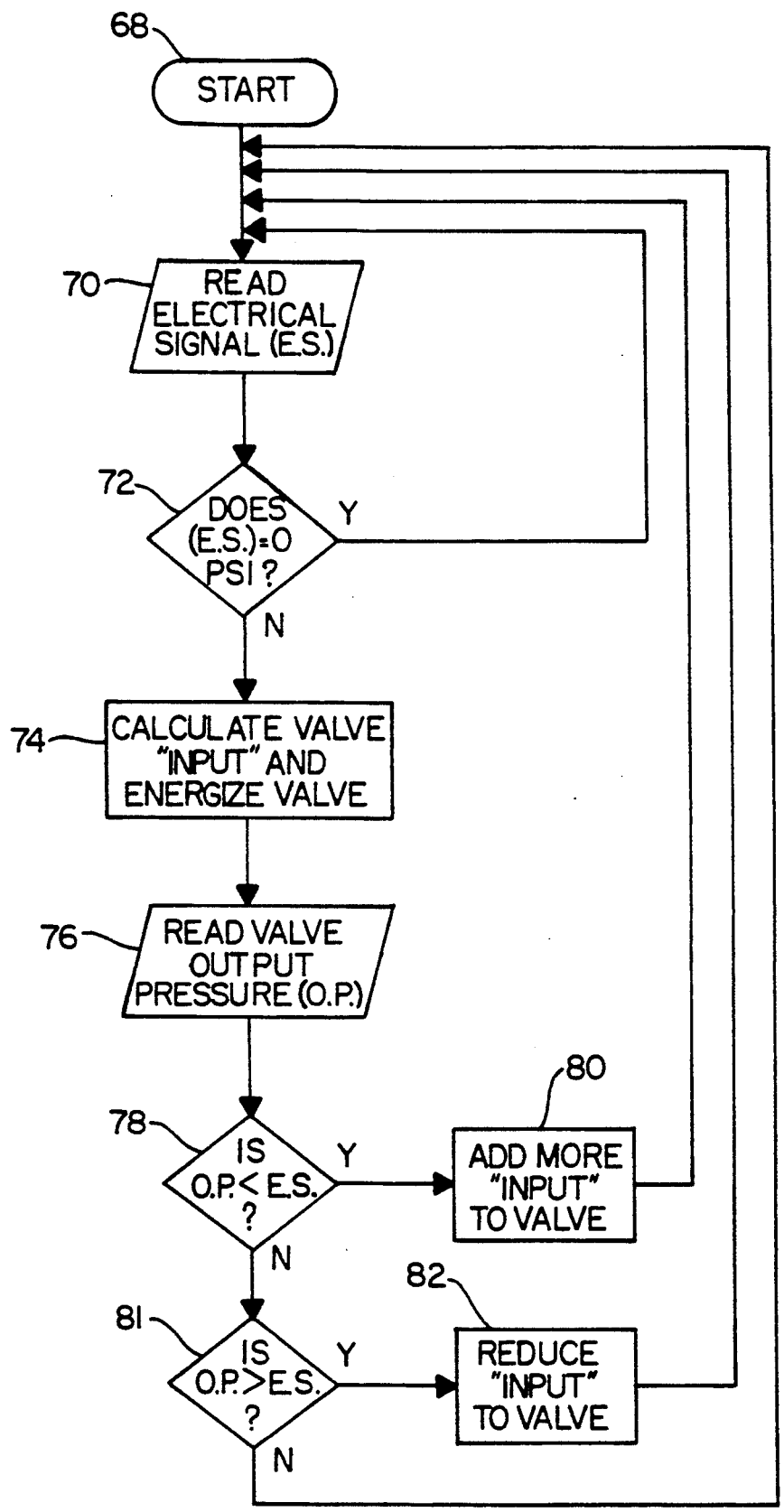
FIG. 4 is a flow chart representing the way in which the microprocessor is used in the converter box illustrated in FIG. 2 is operated.

Referring now to FIG. 4, which diagrammatically illustrates the manner in which the microprocessor 50 is programmed, the program is started as indicated at 68. The electrical signal indicating the magnitude of the desired brake application as effected by the vehicle operator is indicated at 70 from the signal conditioner 52. The output of 70 is then tested as at 72 to determine if the vehicle operator demands braking. If the pressure level demanded by the operator is 0, the program cycles back to the start at 68. If braking is being demanded, the value of the signal which is to be transmitted to the solenoid valve 54 is calculated as indicated at 74. This calculation can be accomplished, for example, by calculation using an appropriate algorithm, or by interpolation between values stored in a look-up table and memory, or by any other suitable means. The value of the output pressure signal as generated by the transducer 64 is then read as indicated at 76. The output pressure is then compared with the value of the electrical signal read at 70 to determine if the output pressure communicated to gladhand coupling 62 is less than the pressure represented by the electrical signal read in 70. This test is effected as indicated at 78. If the output pressure is less than the pressure represented by the electrical signal ES, a predetermined increment is added to the signal transmitted to solenoid 54, as indicated at 80 in FIG. 4, and the program then cycles back to the start 68. If the output pressure is sensed by transducer 64 is greater than the pressure represented by the electrical signal ES as read at 70, the output signal to proportional solenoid 54 is reduced by a predetermined incremental amount, as indicated at 82, and the program cycles back to 68. Since the program illustrated can be executed very quickly, the output to the gladhand coupling 62 is quickly controlled to within a small increment of the pressure level demanded by the vehicle operator by operation of the aforementioned foot or hand brake control mechanisms.

Figure 3:
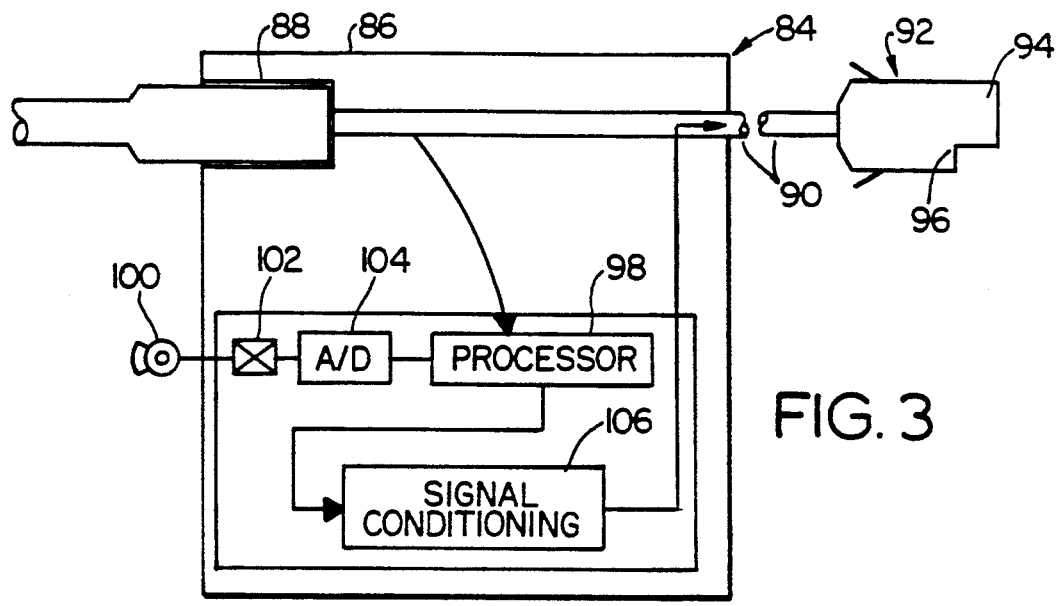
FIG. 3 is a diagrammatic illustration of a converter box used to provide an interface between an pneumatically tractor and an electropneumatically braked trailer.

Referring now to FIG. 3, a converter box generally indicated by the numeral 84 converts the pneumatic signals generated by the vehicle operator to effect braking during operation of tractor 12 equipped with a standard, conventional pneumatic braking system. The converter box 84 includes a housing 86 which, like the converter box 38, is adapted to be portable so that the converter box 84 may be transferred to vehicle to vehicle as necessary to effect the appropriate conversion. Housing 86 includes a receptacle 88 which receives the connector 36 which is a standard, conventional seven-pin conductor connected to the jumper cable 32. The input received from the cable 32 is fed directly through the converter box 84 into an output cable 90 which, as will be seen hereinafter, includes conductors in addition to the normal seven conductors which are used to supply power to the lighting system on the trailer 16. Accordingly, the cable 90 is provided with an electropneumatic connector 92, of the type disclosed in U.S. Pat. No. 4,842,532, and which is connected in the receptacle 34 on the trailer 16, which is equipped with an electropneumatically controlled braking system, in which service brake actuation is controlled by electrical signals. The connector 92 includes offset portions 94, 96. The standard seven conductor portion of the cable 90 terminates in the offset portion 94 and the additional connectors which provide electropneumatic braking terminate at offset portion 96. Power is tapped off from an appropriate one of the seven conductors carried through the housing 86 and is used to power a microprocessor 98.

The conventional service brake line 26 carried by the tractor 12 is connected with the conventional gladhand coupling 100 which is attached to the converter box 84. A transducer 102 within the converter box reads the pressure level at the connector 100 and generates an output signal in response thereto. The electrical output signal generated by transducer 102 is converted to digital by conventional analog-to-digital converter 104 and is fed into the microprocessor 98. The processor 98 generates an output signal actuating the brakes on the trailer, which is fed through signal conditioning unit 106 and then through the cable 90 to one of the conductors terminating in the offset portion 96 of the connector 92.

Figure 5:
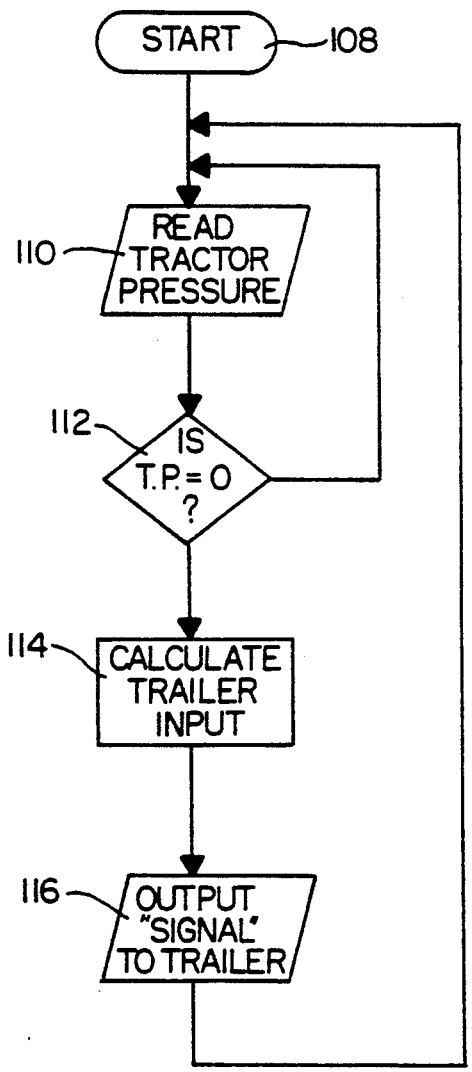
FIG. 5 is a diagrammatic illustration of the way in which the microprocessor used in the converter box illustrated in FIG. 3 is operated.

Referring now to FIG. 5, the program controlling the microprocessor 98 is illustrated in detail. The program is started as indicated at 108, and the microprocessor 98 is caused to read the tractor pressure as represented by the signal generated by transducer 102 and converted to digital by the converter 104. This is indicated at 110 on FIG. 5. The signal read from the converter 104 is then tested as at 112 to determine if the vehicle operator is demanding braking. Accordingly, if the operator is demanding a 0 pressure level, indicating brake release, the program cycles back to the start 108. If the vehicle operator is demanding braking pressure, the value of the output signal to be transmitted to the electropneumatically braked trailer is calculated at 114. Again, this calculation may be effected by use of appropriate algorithm, or by use of interpolation between values stored in memory and a look-up table. This signal is then outputted to the trailer as indicated at 116, through signal conditioner 106. The program then cycles back to the start 108.

I claim:

1. Interface converter box for converting a first type of brake control signal controlling the brakes of a tractor unit of a tractor-trailer combination vehicle to a second type of brake control signal controlling the brakes of a trailer unit of said combination vehicle, one of said first and second types of brake control signals comprising pneumatic braking signals and the other of said first and second types of brake control signals comprising electrical braking signals, said interface converter box including connecting means for receiving electrical power and said first type of brake control signals from the tractor unit and for transmitting said second type of brake control signals to said trailer unit, and converting means for converting said first type of brake control signals to the second type of brake control signals, said converting means including a trailer plug assembly for connection with the trailer unit and a receptacle for receiving a tractor plug assembly for connection with the tractor unit, said plug assemblies being connected by conductive means for transmitting electrical power from the tractor unit to the trailer unit through said interface convertor box, one of said plug assemblies being connectable to the unit having a braking system controlled by said electrical braking signals, said one plug assembly having a pair of offset portions, one of said offset portions carrying conductors transmitting electrical power, the other of said offset portions carrying conductors transmitting said electrical braking signals.

2. Interface convertor box for converting brake control signals as claimed in claim 1, wherein said tractor braking system is controlled by pneumatic braking signals and said trailer braking system is controlled by electrical braking signals, said converting means generating said electrical braking signals and causing the latter to vary as a function of the pneumatic braking signals.

3. Interface convertor box for converting brake control signals as claimed in claim 1, wherein said tractor braking system is controlled by electrical braking signals and said trailer braking system is controlled by pneumatic braking signals, said converting means generating said pneumatic braking signals and causing the latter to vary as a function of the electrical braking signals.

4. Interface convertor box for converting brake control signals as claimed in claim 1, wherein said tractor braking system is controlled by pneumatic braking signals and said trailer braking system is controlled by electrical braking signals, said converting means including a pressure transducer responsive to said pneumatic braking signals and generating an electrical signal which varies in accordance with said pneumatic braking signals.

5. Interface convertor box for converting brake control signals as claimed in claim 4, wherein said converting means includes a microprocessor for calculating said electrical braking signals, said microprocessor having an input receiving said electrical signal generated by said transducer.

6. Interface convertor box for converting brake control signals as claimed in claim 5, wherein said connecting means includes a pneumatic coupling for engagement with a corresponding coupling in the tractor braking system for communicating said pneumatic braking signals to said transducer.

7. Interface convertor box for converting brake control signals as claimed in claim 1, wherein said tractor braking system is controlled by electrical braking signals and said trailer braking system is controlled by pneumatic braking signals, said converting means including a proportional pressure modulating valve having an inlet receiving supply pneumatic pressure from said tractor braking system and an outlet for transmitting a variable pneumatic pressure level to said transmitting means.

8. Interface convertor box for converting brake control signals as claimed in claim 7, wherein said proportional pressure modulating valve includes a proportional solenoid actuator for generating a pressure level at said output which varies in accordance with said electrical braking signals.

9. Interface convertor box for converting brake control signals as claimed in claim 8, wherein said converting means further includes a pressure transducer for generating an electrical signal which varies as a function of the pressure level at the output of the proportional pressure modulating valve, and a microprocessor having a first input receiving said electrical braking signals, a second input receiving said signal from the transducer, and an output for transmitting a control signal to said solenoid actuator, said microprocessor being responsive to the signals at said first and second inputs to calculate said control signal.

10. Interface convertor box for converting brake control signals as claimed in claim 9, wherein said connecting means includes a pneumatic coupling for engagement with a corresponding coupling on the tractor for communicating said proportional pressure modulating valve with a pneumatic pressure source.

11. Interface convertor box for converting brake control signals as claimed in claim 1, wherein said converting means includes a pressure transducer for generating an electrical signal which varies in accordance with variations in the pressure level of the pneumatic braking signals.

12. Interface convertor box for converting brake control signals as claimed in claim 11, wherein said converting means includes a microprocessor receiving the electrical signal generated by said transducer.

13. Interface convertor box for converting brake control signals as claimed in claim 5, wherein said microprocessor is powered by the electrical power transmitted through said interface convertor box by said plugs and the conductive means.

14. Interface convertor box for converting brake control signals as claimed in claim 9, wherein said microprocessor is powered by the electrical power transmitted through said interface convertor box by said plugs and the conductive means.

15. Interfaced unit for converting brake control signals as claimed in claim 12, wherein said microprocessor is powered by the electrical power transmitted through said interface convertor box by said plugs and the conductive means.

* * * * *